2,815,294
Patented Dec. 3, 1957

2,815,294
STABILIZED SOIL

Jules E. Havelin, Havertown, and Frank Kahn, Philadelphia, Pa.

No Drawing. Application December 22, 1954, Serial No. 477,122

6 Claims. (Cl. 106—118)

This invention relates to the stabilization of fine, plastic silts or clay soils.

This application is a continuation-in-part of our copending applications Serial Nos. 245,651 and 245,652, now U. S. Patent No. 2,698,252, both filed August 18, 1951, wherein we disclose stabilized soil compositions including lime and fly ash which are incorporated into the soil. Various soils, even including highly plastic soils, can be successfully stabilized by reacting them with lime and fly ash causing the product to set in accordance with the inventions disclosed in the aforementioned copending applications. Although the compositions set relatively slowly, they have good compressive strength even during the early stages of the setting period. After setting for a sufficient time, the compositions develop excellent compressive strength and have sufficient stability as load supporting bases for road building and other operations.

However, it has now been found that certain of the more plastic soils, when stabilized in accordance with the disclosures of the aforementioned copending applications, are lacking in durability under certain adverse weather conditions during the early stages of the setting period. It is desirable to provide a road base which has good stability immediately after the road base is laid down, and such base must have the property of retaining its stability even when it is exposed to severe weather conditions, such as alternate cycles of wetting and drying, frost action, or freezing and thawing, for example. The ability of a stabilized soil mixture to stand up under severe weather conditions during the early stages of the setting period, while said mixture is also subjected to heavy engineering loading, is referred to hereinafter as the durability of the soil mixture.

Attempts to improve the early durability characteristics of plastic soils, by adding lime and fly ash, are not successful. In fact, when an A–6 or A–7 clayey soil is combined with fly ash, for example, the progressive addition of lime decreases the water retentivity of the composition, which indicates that the lime is not acting in co-operation with the other components of the mixture to improve its early durability.

It is accordingly an object of this invention to provide an improved soil stabilization composition for stabilizing plastic soils. Still another object of this invention is to provide a stabilized soil composition including plastic soil, which composition has capacity to support heavy loads during the early stages of the setting period. Still another object of this invention is to provide an inexpensive means for stabilizing very plastic soils in such manner that the stabilized soil composition has sufficient pliability during the early stages of the setting period to permit compacting and re-shaping after compacting, but which composition has sufficient durability during the early stages of the setting period to support heavy loads without excessive deformation, even when subjected to severe weather conditions such as repeated wetting and drying or freezing and thawing, for example.

It is still another object of this invention to provide a means for stabilizing plastic silts or clay soils to provide compositions having excellent early load-bearing and durability properties, and without adversely effecting the compressive strength or other engineering properties of the final product after setting.

Other objects and advantages of this invention will further become apparent hereinafter.

We have now discovered that very plastic soils, when stabilized with specific proportions of lime, aggregate particles and fly ash, have remarkably improved durability during the early stages of the setting period.

The relative proportions of the ingredients are critical, as will further become apparent. We have found that the water retentivity of the composition decreases with lime addition when a small proportion of aggregate is incorporated into the composition, but surprisingly, the water retentivity increases with lime addition when the proportion of aggregate is in the range of about 20%–50% by weight, based on the total weight of fly ash plus soil plus aggregate.

As used throughout this specification and claims, the term "lime" is used to indicate quicklime, hydrated lime, and slaked lime. The term "hydrated lime" indicates a dry powder obtained by treating quicklime with water enough to satisfy its chemical affinity for water under the conditions of its hydration. Hydrated lime consists essentially of calcium hydrate or a mixture of calcium hydrate and/or magnesium oxide and/or magnesium hydroxide. In the above definition quicklime is used to indicate a calcined material the major portion of which is calcium oxide (or calcium oxide in natural association with a lesser amount of magnesium oxide) capable of slaking with water. The term "slaked lime" is used interchangeably with "hydrated lime." Both hydrated lime and slaked lime may be associated with excess water, resulting in a moist or slurried state or condition.

The term "fly ash" as used in the present specification is intended to indicate the finely divided ash residue produced by the combustion of pulverized coal, which ash is carried off with the gases exhausted from the furnace in which the coal is burned and which is collected from these gases usually by means of suitable precipitation apparatus such as electrical precipitators. The fly ash so obtained is in a finely divided state such that at least about 70% passes through a 200 mesh sieve.

The term "plastic soil" as used throughout this specification and the claims hereof is intended to indicate natural substantially inorganic material of the type of clay, loam or silt, which soil is so fine that the normal method of soil evaluation does not include fineness modulus determination. The majority of the soil passes through a standard 100-mesh sieve. While we designate this material as "inorganic," the presence of minor proportions of organic materials is not excluded, provided the fine material is predominantly inorganic.

Plastic soil, within the meaning of the term as applied to this invention, includes all soils which have a plasticity index of more than 15, all soils which have a plasticity index of about 9–15 when more than about 15% by weight of the soil passes a standard 200-mesh sieve, and all soils which have a plasticity index of less than about 9 when more than about 35% by weight of the soil passes a standard 200-mesh sieve.

The plasticity index of a soil is the numerical difference between the liquid limit and the plastic limit of the soil.

The liquid limit of a soil is that water content at which the soil passes from the plastic or semi-solid state to a liquid state. The plastic limit of the soil is the lowest water content at which the soil becomes plastic or the content at which the soil changes from a solid to a semi-solid state. Tests for liquid limit and plastic limit are standard in the art. ASTM specifications D423–54T and D424–54T as well as AASHO designations T–89–49, T–90–49 and T–91–49, which are incorporated herein by reference, define standard procedures for determining the liquid limit and plastic limit of a soil, and hence its plasticity index.

The term "aggregate" in accordance with this invention refers to natural or artificial inorganic materials which are substantially chemically inert with respect to fly ash and lime, and substantially insoluble in water, such as limestone screenings, natural sand, sand prepared from stone, blast furnace slag, gravel, or other equivalent materials having similar characteristics. In accordance with this invention a relatively coarse aggregate is included, as well as fine aggregate. An aggregate, within the meaning of the term as used in this specification, is a mixture of finely divided particles which may include limited amounts of relatively coarse particles, and may even include particles up to about ½ inch in size. Approximately the majority of the aggregate preferably consists of particles ranging in size from about 40 mesh to about ½ inch. Preferably, the sizing of the aggregate falls within the following range:

| Screen size | Percent by weight passing |
| --- | --- |
| ½" | 90-100 |
| #4 | 75-100 |
| #10 | 40-90 |
| #40 | 5-35 |
| #200 | 0-15 |

The relative proportions of the principal components of the compositions are important. When the proportions are maintained within a limited range, surprising durability improvement is obtained in the early stages of the setting period. The preferable proportions are as follows, percentages being by weight:

| Material | Percent (based on total of fly ash, soil, and aggregate) |
| --- | --- |
| Fly Ash | 5-25 |
| Soil | 35-75 |
| Aggregate | 20-50 |
| Lime | 2-9 |

As expressed above, the sum of the percentages of fly ash plus soil plus aggregate are substantially equal to 100. This is the basis used throughout the specification and claims in specifying proportions of the components of our compositions.

The durability characteristics of these compositions are readily determined by testing samples thereof for underwater disintegration. One such method consists of forming a standard test block of the composition under investigation, allowing the block to set for a relatively short period, such as three days for example, under substantially dry conditions, and then submerging the block for several hours under still water. A sample having relatively poor durability tends to disintegrate, and a rough measure of its value is obtained by weighing the block after removing it from the water, to determine the loss of weight due to underwater disintegration. In accordance with this invention, even very plastic soils are converted to products having such excellent durability that in some cases the weight loss due to disintegration under water is substantially zero.

Underwater disintegration tests illustrate that, at about 20% by weight of aggregate, the aggregate coacts with the lime, fly ash and soil in such manner that the four ingredients act as a mixture rather than separate, distinct materials. At proportions below about 20% by weight aggregate, the progressive addition of lime to the soil plus fly ash plus aggregate tends to decrease the water retentivity of the composition; however, when the proportion of aggregate is increased to a value above 20% by weight the progressive addition of lime to the soil plus fly ash plus aggregate increases the water retentivity. This was entirely unexpected, and probably explains why the compositions of this invention function as well as they do. Repeated tests have established the fact of the existence of this phenomenon, as well as its practical merit.

The ingredients of our compositions may be prepared in any conventional manner, such as by simple mixing of the solid components, preferably in the presence of water. However, the mixing is preferably carried into effect by breaking up the soil and mixing the soil with lime, fly ash and aggregate in predetermined proportions, utilizing suitable soil breaking and mixing equipment such as equipment conventionally used for farm and construction purposes. Water is added to the mixture in an amount substantially equal to that proportion of water known and defined as the optimum moisture content. Optimum moisture content is determined by the well known modified Proctor test.

Optimum moisture content of a soil or stabilized soil mixture is that moisture content at which the soil-moisture mix has the maximum dry density, or maximum dry weight of solids per unit volume. In practice, the optimum water content varies with each particular soil and stabilized soil mixture, ordinarily within the range of 8-25% moisture by weight, based on the total dry weight of solids. Preferably, in incorporating moisture into our stabilized soil mixes, the water content should be controlled within the range of 70%-130% of the optimum water content. Thus the water content of the stabilized road base may vary from about 5%-32% by weight, based on the weight of total lime, fly ash, soil and aggregate, for different soils.

After mixing, the stabilized soil product may be formed to the desired shape. After curing for a very short period of time, for example two to five days, it develops considerable stability even when wet, but the cementitious bond of the mix develops so slowly that even after a week, the formed mix can readily be deformed and reshaped. After setting for a considerable period, such as one month for example, the mix has a very substantial compressive strength and after one year the product is exceedingly strong.

The following examples are illustrative of the invention:

EXAMPLE 1

A soil was selected comprising a plastic A-6 clay, located in Southeast Pennsylvania. The soil had the following sieve analysis:

| Screen No. | Percent by weight passing |
| --- | --- |
| ¾" | 100.0 |
| ⅜" | 99.0 |
| 4 | 98.0 |
| 10 | 97.6 |
| 40 | 97.2 |
| 60 | 97.0 |
| 200 | 96.5 |

The soil had a plasticity index of 14 and a liquid limit of 32. The soil was mixed with hydrated lime, fly ash, and dolomitic limestone screenings, in the presence of optimum water, the proportions of solids being as follows:

| | Percent by weight (based on total soil, fly ash, and limestone screenings) |
| --- | --- |
| A-6 soil | 70 |
| Lime (hydrated) (dolomitic) | 9 |
| Fly ash | 10 |
| Limestone screenings | 20 |

The resulting material, after compaction, was allowed to set under natural ambient conditions for three days. Samples (compacted cubes) of the stabilized product were submerged in water for three hours and showed substantially zero weight loss. In addition, the mix had sufficient durability to support heavy trucks which were driven over it, even when subjected to repeated cycles of alternate wetting and drying, as contrasted to the very poor stability of the natural A-6 soil. Test cubes of the natural A-6 soil, when tested for underwater disintegration after exposure for three days under natural ambient conditions, substantially completely disintegrated within a few minutes when submerged in water.

After setting for twenty eight days under natural ambient conditions, the stabilized product showed excellent compressive strength on the order of about 300 lbs. per square inch, as contrasted to substantially zero compressive strength for the natural soil. The stabilized product also had radically improved resistance to freezing and thawing and wetting and drying as indicated by a standard wire brush test which showed that the stabilized material stands up after numerous cycles, as contrasted to the natural soil which fails to stand up after one cycle.

EXAMPLE 2

The following compositions further illustrate compositions within the scope of this invention which have high early stability (3 days) and have excellent engineering properties after setting for twenty eight days:

Table I

| Type Aggregate | Soil | | Percent by wt. Lime | Percent by wt. Fly Ash | Percent by wt. Soil | Percent by wt. Aggregate |
|---|---|---|---|---|---|---|
| | PI | Percent Passing 200 Mesh | | | | |
| Limestone Screenings | 2.0 | 47 | 5 | 10 | 70 | 20 |
| Do | 2.0 | 47 | 2 | 5 | 75 | 20 |
| Do | 2.0 | 47 | 8 | 25 | 55 | 20 |
| Do | 8.0 | 37 | 5 | 10 | 60 | 25 |
| Do | 8.0 | 37 | 6 | 15 | 45 | 40 |
| Gravel | 8.3 | 40 | 4 | 10 | 65 | 25 |
| Do | 8.3 | 40 | 8 | 25 | 40 | 35 |
| Limestone Screenings | 8.9 | 37 | 5 | 10 | 60 | 30 |
| Do | 8.9 | 37 | 6 | 20 | 60 | 20 |
| Boiler Slag | 9.1 | 19 | 3 | 10 | 65 | 25 |
| Do | 9.1 | 19 | 7 | 25 | 55 | 20 |
| Do | 9.9 | 55 | 5 | 10 | 55 | 35 |
| Do | 9.9 | 55 | 3 | 5 | 45 | 50 |
| Limestone Screenings | 10.0 | 53 | 5 | 10 | 50 | 40 |
| Do | 11.0 | 21 | 5 | 10 | 60 | 30 |
| Do | 14.0 | 96 | 5 | 10 | 45 | 45 |
| Do | 14.0 | 96 | 9 | 15 | 35 | 50 |
| Gravel | 17.0 | 23 | 5 | 10 | 55 | 35 |
| Boiler Slag | 24.0 | 45 | 5 | 10 | 50 | 40 |
| Do | 24.0 | 45 | 9 | 15 | 35 | 50 |

EXAMPLE 3

A mixture was prepared consisting of 90% by weight plastic A-7 soil, 10% by weight fly ash and 5% by weight lime. After mixing with optimum water and setting under natural ambient conditions for three days, it was tested for durability by submerging standard test cubes in water. The test cubes disintegrated so rapidly that no quantitative measurement of loss was obtainable.

A composition was prepared consisting of 60% by weight of the same A-7 soil, 10% by weight fly ash, 5% by weight lime and 30% by weight limestone screenings. After mixing with optimum water and setting under natural ambient conditions for three days, test cubes of the resulting mix were submerged in water and tested for disintegration. Substantially no weight loss was observed after submerging the cubes for three hours.

EXAMPLE 4

In a series of tests, a plastic kaolin (A-7) was stabilized with varying quantities of lime, fly ash and limestone screenings. The samples were allowed to set for a short time, water was added, and each sample was tested for water retentivity. According to this test, each soil sample was placed on top of a piece of filter paper supported on the flat perforated ceramic bottom of a Buchner funnel, and a standard suction was applied. After a certain time, the filter paper or ceramic support became wet, and this fact was visually observed. Increments of time were measured and reported as water retentivity count. The following results were obtained.

Table II.—Effect of lime on water retentivity count of stabilized kaolin

| Wt. Kaolin | Wt. Fly Ash | Wt. Aggregate (Screenings) | Wt. Lime | Water Retentivity Count |
|---|---|---|---|---|
| 90 | 10 | 0 | 0 | 33 |
| 90 | 10 | 0 | 3 | 31 |
| 90 | 10 | 0 | 6 | 29 |
| 90 | 10 | 0 | 9 | 27 |
| 70 | 10 | 20 | 0 | 25 |
| 70 | 10 | 20 | 3 | 24 |
| 70 | 10 | 20 | 6 | 19 |
| 70 | 10 | 20 | 9 | 20 |
| 50 | 10 | 40 | 0 | 20 |
| 50 | 10 | 40 | 3 | 20 |
| 50 | 10 | 40 | 6 | 21 |
| 50 | 10 | 40 | 9 | 23 |
| 30 | 10 | 60 | 0 | 15 |
| 30 | 10 | 60 | 3 | 17 |
| 30 | 10 | 60 | 6 | 20 |
| 30 | 10 | 60 | 9 | 19 |

The above example illustrates that, although the water retentivity count of the composition decreases with lime addition when a small proportion of aggregate is present, this effect is reversed and the water retentivity count of the composition increases with lime addition when the proportion of aggregate is in the range of about 20%–50% by weight. This effect indicates that an interaction takes place among the lime, fly ash, soil and aggregate.

EXAMPLE 5

A series of underwater disintegration tests was run, using a Maryland A-7 clay. Various specimens were prepared, containing various proportions of limestone screenings as aggregate, and all specimens were submerged in water for 60 hours, after which they were checked for hardness and compressive strength as well as underwater disintegration. The results are tabulated in the following table:

Table III

| Test No. | Percent by weight | | | | Hardness | Compressive Strength | Percent Disintegration | | |
|---|---|---|---|---|---|---|---|---|---|
| | Lime | Fly Ash | Soil | Aggregate | | | 1½ hrs. | 24 hrs. | 60 hrs. |
| 1 | 3 | 10 | 90 | 0 | Very poor | Sample crumbled | 15 | 38 | Almost complete. |
| 2 | 5 | 10 | 90 | 0 | do | do | 8 | 26 | 40. |
| 3 | 5 | 10 | 80 | 10 | Poor | do | 3.5 | 16 | 20. |
| 4 | 5 | 10 | 70 | 20 | Very good | 450 p. s. i. | 0 | 1 | 2. |
| 5 | 5 | 10 | 60 | 30 | do | 465 p. s. i. | 0 | 0.5 | 1. |
| 6 | 5 | 10 | 50 | 40 | do | 485 p. s. i. | 0 | 0.2 | 0.5. |

The foregoing table illustrates that the underwater disintegration is sharply reduced and almost entirely eliminated when the percentage aggregate approaches about 20% by weight, when lime and fly ash proportions are maintained constant. This indicates that an interaction takes place at about 20% by weight aggregate.

When a plastic soil, having high water retentivity, is mixed with aggregate in an effort to improve the soil to provide a road base, the results are unsatisfactory even though a very large proportion of aggregate is added. For example, when over 50% aggregate is added to a plastic silt or to a plastic clay, the product quickly fails when subjected to alternate cycles of wetting and drying or freezing and thawing, when also subjected to heavy loads. It is accordingly surprising that the same soil can be stabilized to form a product having excellent durability under the same conditions, when small proportions of lime and fly ash and as little as 20% by weight of aggregate are incorporated into the soil. While the straight addition of aggregate to plastic soil is very costly because of the large quantity of aggregate required to create a good road base, the same soils are efficiently and economically stabilized in accordance with this invention, which requires much less aggregate, together with small amounts of fly ash and lime, at a drastically reduced total cost.

It will be appreciated that large aggregate, as distinguished from the aggregate in accordance with this invention and hereinbefore referred to, such as ½ inch stones or even larger, may be incorporated into the stabilized soil mixture without departing from the scope of this invention. The expression "consisting essentially of" as used in the claims does not imply that the compositions of the invention must be free of other additives; it is intended as a definition of those components which must be present in order to obtain the benefits of the invention, and these benefits are obtained whether our components are present alone or mixed with one or more compatible additives.

Having thus described our invention, we claim:

1. A stabilized soil composition of matter consisting essentially of about 5% to about 25% by weight fly ash, about 35% to about 75% by weight plastic soil, about 20% to about 50% aggregate, the sum of the percentages of fly ash, soil and aggregate being substantially equal to 100%, and about 2% to about 9% lime, the percentage of lime being based on the total weight of fly ash, soil and aggregate, said aggregate comprising a plurality of discrete particles which are substantially chemically inert with respect to fly ash and lime, and substantially insoluble in water, the majority of said particles ranging in size from about forty mesh to about one half inch.

2. The stabilized soil composition of matter defined in claim 1, wherein the soil is selected from the group consisting of clay, loam and silt.

3. The stabilized soil composition defined in claim 1, wherein the soil is limited to those soils having a plasticity index below about 9 when more than about 35% by weight of the soil passes a standard 200-mesh sieve, to those soils having a plasticity index of about 9-15 when more than about 15% by weight of the soil passes a standard 200-mesh sieve, and to those soils having a plasticity index of above about 15.

4. The stabilized soil composition defined in claim 1, wherein the aggregate has the following screen analysis:

| Standard screen size | Percent by weight passing |
|---|---|
| ½" | 90-100 |
| #4 | 75-100 |
| #10 | 40-90 |
| #40 | 5-35 |
| #200 | 0-15 |

5. A stabilized soil composition of matter consisting essentially of about 5 to about 25% by weight fly ash, about 35 to about 75% by weight soil, said soil being limited to those soils having a plasticity index below about 9 when more than about 35% by weight of the soil passes a standard 200-mesh sieve, to those soils having a plasticity index of about 9-15 when more than about 15% by weight of the soil passes a standard 200-mesh sieve, and to those soils having a plasticity index above about 15, about 20% to about 50% aggregate, said aggregate comprising discrete particles of predominantly inorganic mineral material selected from the group consisting of limestone, sand, gravel and slag particles of which about 90-100% by weight passes a standard ½" sieve, about 75-100% by weight passes a standard No. 4 sieve, about 40-90% by weight passes a standard No. 10 sieve, about 5-35% by weight passes a standard No. 40 sieve, and about 0-15% by weight passes a standard No. 200 sieve, the sum of the percentages of aggregate, fly ash and soil being substantially equal to 100%, and about 2% to about 9% by weight lime, the percentage of lime being based on the total weight of fly ash, soil and aggregate.

6. A stabilized compact supporting course for a road, highway or the like, characterized by early durability and pliability sufficient for re-compacting, consisting essentially of about 5% to about 25% by weight fly ash, about 35% to about 75% by weight plastic soil, about 20% to about 50% by weight aggregate, said aggregate comprising a plurality of discrete particles which are substantially chemically inert with respect to fly ash and lime, and substantially insoluble in water, the majority of said particles ranging in size from about 40 mesh to about one-half inch, the sum of the percentages of fly ash, soil and aggregate being substantially equal to 100%, about 2% to about 9% by weight lime, the percentage of lime being based on the total weight of fly ash, soil and aggregate, and about 5% to 32% by weight of water, a percent water being based on the total weight of lime, fly ash, soil and aggregate.

References Cited in the file of this patent
UNITED STATES PATENTS
2,564,690    Havelin et al.     Aug. 21, 1951